US 6,654,255 B2

(12) United States Patent
Kruse et al.

(10) Patent No.: US 6,654,255 B2
(45) Date of Patent: Nov. 25, 2003

(54) SYSTEM FOR MOUNTING DATA COMMUNICATION EQUIPMENT

(75) Inventors: Grant J. Kruse, Huntsville, AL (US); James B. Coker, Harvest, AL (US)

(73) Assignee: Adtran, Inc., Huntsville, AL (US)

( * ) Notice: Subject to any disclaimer, the term of this patent is extended or adjusted under 35 U.S.C. 154(b) by 218 days.

(21) Appl. No.: 09/734,321

(22) Filed: Dec. 1, 2000

(65) Prior Publication Data

US 2001/0023774 A1 Sep. 27, 2001

Related U.S. Application Data

(60) Provisional application No. 60/168,527, filed on Dec. 2, 1999.

(51) Int. Cl.[7] .............................. H05K 7/14; H05K 5/00; H02B 1/42; A47B 81/00
(52) U.S. Cl. ........................ 361/799; 361/796; 361/726; 361/728; 361/729; 361/730; 361/600; 211/41.17; 174/52.1; 312/223.1
(58) Field of Search .......................... 361/726, 728–732, 361/740–741, 747, 759, 796–799, 826, 829, 600; 312/223.1, 223.2; 174/56, 52.1; 211/41.17

(56) References Cited

U.S. PATENT DOCUMENTS

| | | | | |
|---|---|---|---|---|
| 3,566,193 A | * | 2/1971 | Jorgensen et al. | 317/101 |
| 4,073,563 A | * | 2/1978 | Bailey et al. | 339/128 |
| 4,152,750 A | * | 5/1979 | Bremenour et al. | 361/363 |
| 4,738,632 A | * | 4/1988 | Schmidt et al. | 439/341 |
| 5,043,847 A | * | 8/1991 | Deinhardt et al. | 361/395 |
| 5,249,979 A | * | 10/1993 | Deinhardt et al. | 439/341 |
| 5,285,355 A | * | 2/1994 | Chabert et al. | 361/784 |
| D345,143 S | * | 3/1994 | Thomas | D13/162 |
| D345,144 S | * | 3/1994 | Thomas | D13/162 |
| 5,302,136 A | * | 4/1994 | St. Germain et al. | 439/376 |
| D373,758 S | * | 9/1996 | Nogas | D13/162 |
| 5,896,485 A | * | 4/1999 | Kirby | 385/134 |
| 6,102,499 A | * | 8/2000 | Chen et al. | 312/223.2 |
| 6,431,909 B1 | * | 8/2002 | Nolden et al. | 439/532 |
| 6,456,495 B1 | * | 9/2002 | Weiloch et al. | 361/729 |
| 6,547,587 B2 | * | 4/2003 | Hurst et al. | 439/532 |

OTHER PUBLICATIONS

Exhibit A, p. 72 of Adtran, Inc. catalog (undated, but admitted to be prior art).

* cited by examiner

*Primary Examiner*—David Martin
*Assistant Examiner*—Dameon E Levi
(74) *Attorney, Agent, or Firm*—Waddey & Patterson; Lucian Wayne Beavers

(57) ABSTRACT

An apparatus is provided for mounting electrical equipment on a wall. A mounting plate is mounted on the wall. The mounting plate includes a lip defining a linear channel extending across the front of the mounting plate. An equipment enclosure includes a complementary upward extending hanger for engaging the linear channel. A ground strip is attached to the wall plate below the linear channel. The equipment enclosure can be positioned at any point along the length of the linear channel by engaging its complementary hanger therewith and pivoting the enclosure downward until its rear surface engages the mounting plate and a grounding lug thereof engages the ground strip.

27 Claims, 12 Drawing Sheets

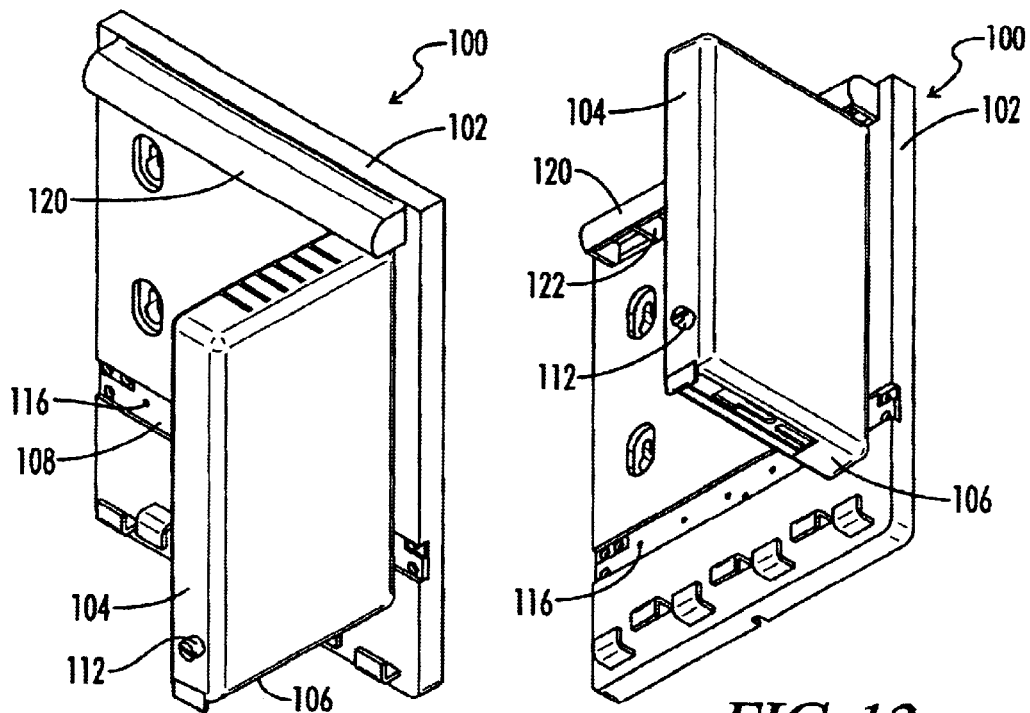
FIG. 12
FIG. 13
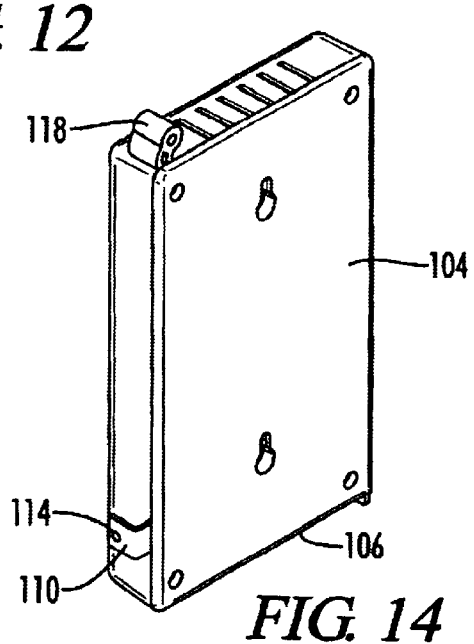
FIG. 14

SYSTEM FOR MOUNTING DATA COMMUNICATION EQUIPMENT

This application claims benefit of our pending U.S. provisional patent application Ser. No. 60/168,527 filed Dec. 2, 1999.

BACKGROUND OF THE INVENTION

1. Field of the Invention

The present invention relates generally to systems for mounting electronic equipment such as data communication equipment used by small businesses and homes on a wall space.

2. Description of the Prior Art

Existing data communication equipment for small business and home products is typically mounted on a wall as single units. Each unit is contained in a housing which is placed flat against the wall and attached thereto by screws or the like. When more than one item of digital communication equipment is mounted on the wall, they are simply individually mounted side-by-side in the same area. This often requires more wall space than is readily available and provides an undesirable space problem for the customer and the equipment provider. This space problem is magnified when the footprint of the particular item of digital communication equipment is relatively large.

Another typical prior art arrangement is to simply place the equipment on shelves attached to the wall.

There is, therefore, a need for a system which allows multiple items of digital communication equipment to be mounted in an existing wall space, which system should allow an increased density of digital communication equipment to be mounted in a given wall space. Such a system is provided by the present invention.

SUMMARY OF THE INVENTION

The present invention provides an apparatus for mounting electrical equipment on a wall space, which apparatus includes a wall plate adapted to be mounted on the wall. The wall plate includes a hooked lip extending horizontally along an upper portion of the wall plate and defining a downwardly open channel. The apparatus further includes an equipment enclosure, including an upwardly extending hooked hanger complementary to the hooked lip and received in the channel, and having a rear surface engaging the wall plate. The channel has an opening depth less than a forward extension distance of the hooked hanger away from the rear surface so that the equipment enclosure must have its lower end pivoted forward away from the wall plate to remove the equipment enclosure from the wall plate.

The wall plate includes a ground strip mounted thereon. A grounding lug extends from the equipment enclosure into engagement with the ground strip when the enclosure is hung from the hooked lip of the wall plate with the rear surface of the enclosure engaging the wall plate.

The downwardly open channel of the wall plate is a continuous channel and thus, the equipment enclosure may be located at any position along the length of the downwardly open channel.

Multiple equipment enclosures may be hung upon the wall plate.

Additional similar wall plates may be mounted on the wall adjacent the first wall plate to extend the mounting apparatus in a modular fashion.

The equipment enclosure is a shallow flat box which extends outward generally perpendicular to the wall. A communications device or other electrical equipment mounted on a printed circuit board is contained in the shallow box. Preferably, the electrical connections from the equipment extend downward out the bottom of the box, and any visual display components such as LEDs are visible through a window in the front edge of the box. Preferably, the box is vented in its top edge to carry heat away from the equipment.

It is therefore an object of the present invention to provide improved systems for mounting of electrical components on a wall.

Another object of the present invention is the provision of electrical equipment mounting systems having reduced cost.

Still another object of the present invention is the provision of electrical equipment mounting systems having reduced size.

Still another object of the present invention is the provision of electrical equipment mounting systems having great flexibility of equipment positioning.

Still another object of the present invention is the provision of an equipment enclosure which can be alternatively mounted either on a wall plate or directly to the wall.

Still another object of the present invention is the provision of a system for mounting electrical apparatus providing an automatic grounding engagement of the apparatus upon mounting of the apparatus.

And another object of the present invention is the provision of an equipment mounting system having cable management systems included therein.

Other and further objects, features and advantages of the present invention will be readily apparent to those skilled in the art upon a reading of the following disclosure when taken in conjunction with the accompanying drawings.

BRIEF DESCRIPTION OF THE DRAWINGS

FIG. 12 is a perspective view of an alternative embodiment of the equipment enclosure and mounting plate, as viewed from above on the right side thereof.

FIG. 13 is a perspective view of the apparatus of FIG. 12 as viewed from below on the right side thereof.

FIG. 14 is a perspective view of the equipment enclosure of the apparatus of FIG. 12, as viewed from the rear and above.

DETAILED DESCRIPTION OF THE PREFERRED EMBODIMENTS

Figure 1:
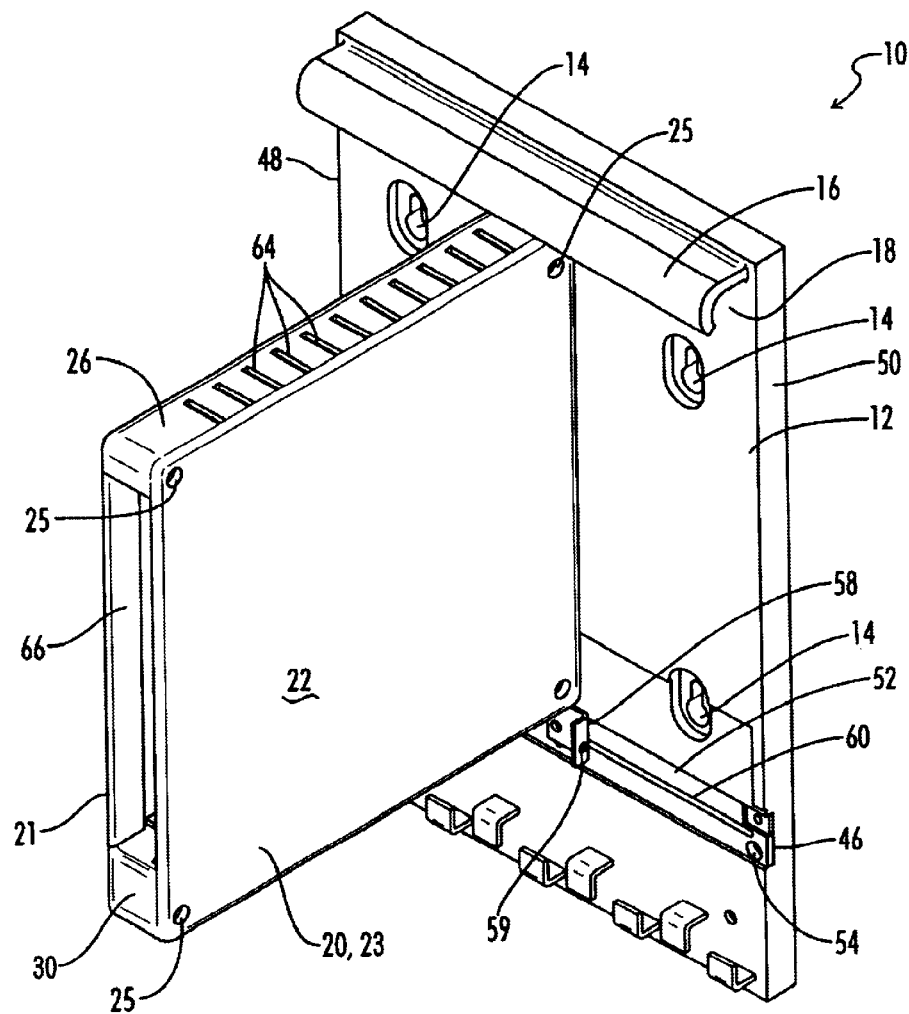
FIG. 1 is a perspective view of one equipment enclosure mounted on a mounting plate, as viewed from above on the right side thereof.
Figure 2:
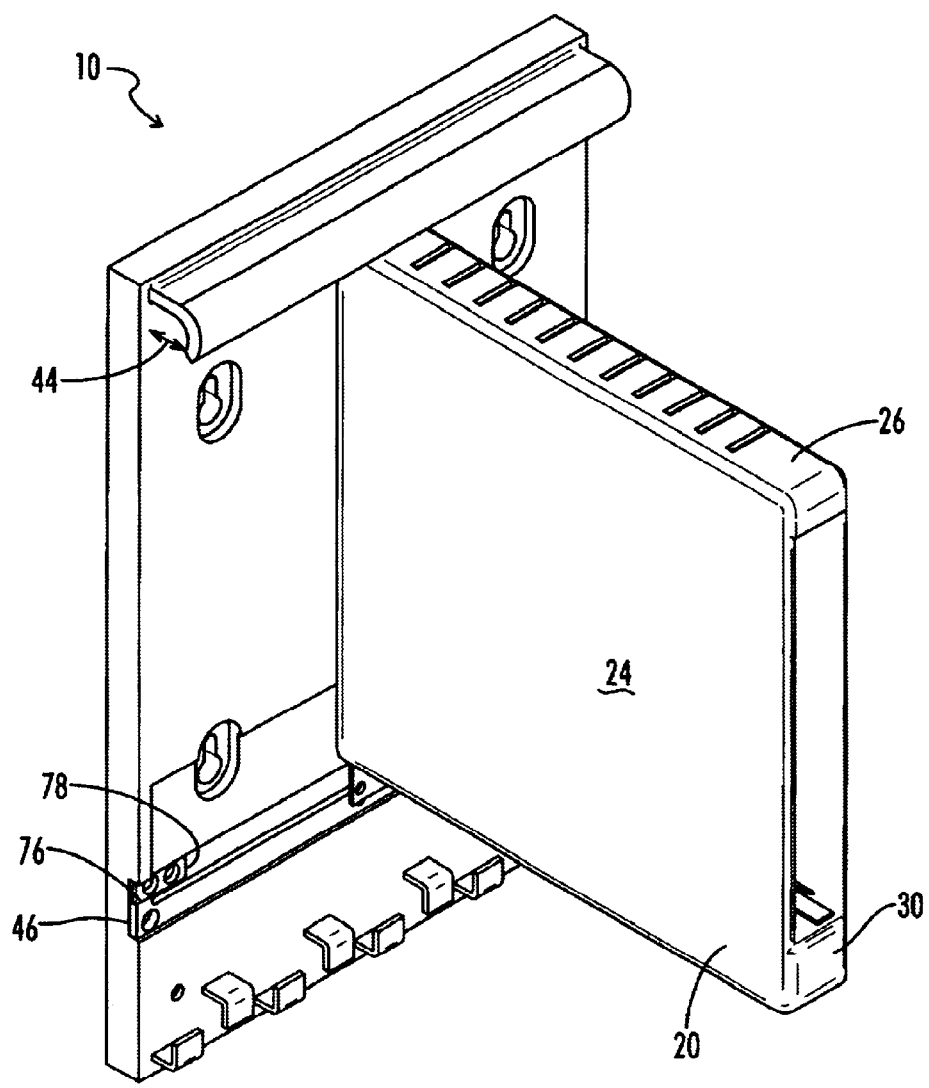
FIG. 2 is a perspective view of the apparatus of FIG. 1 as viewed from above on the left side thereof.
Figure 3:
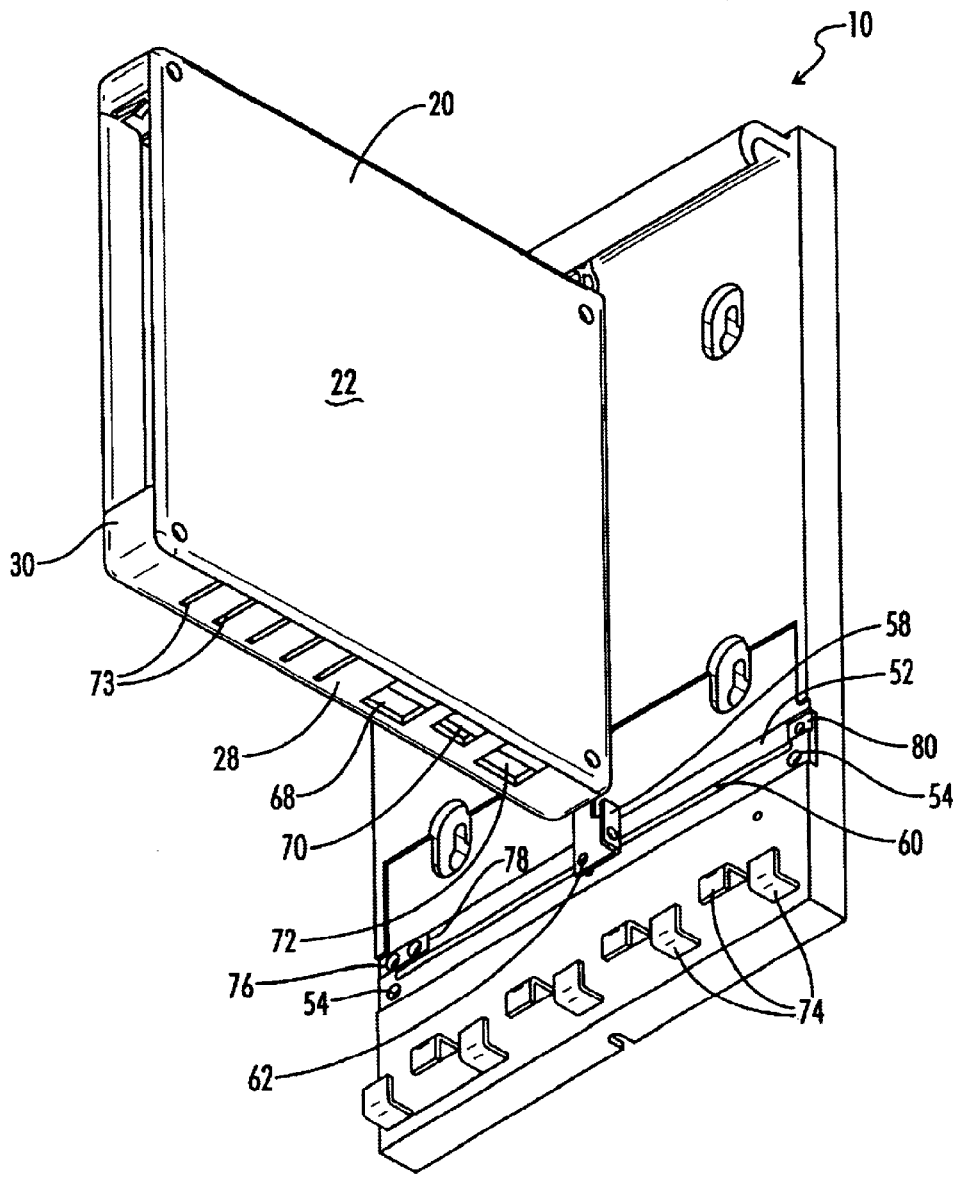
FIG. 3 is a perspective view of the apparatus of FIG. 1 as viewed from below on the right side thereof.

Referring now to the drawings, and particularly to FIG. 1, the equipment mounting apparatus of the present invention is shown and designated by the numeral 10. The apparatus 10 includes a wall plate 12 which may also be referred to as a mounting plate 12. The wall plate 12 may be mounted upon a wall with a plurality of screws (not shown) extending through mounting holes 14. Wall plate 12 is preferably molded from a plastic material.

The wall plate 12 includes a hooked lip 16 extending horizontally along an upper portion thereof and defining a downwardly open channel 18.

The hooked lip 16 is a continuous member extending across substantially the entire width of the mounting plate 12 so that the position of enclosure 20 is infinitely adjustable along the length of the lip 16. The hooked lip stops just short of the left and right edges 48 and 50 of mounting plate 12.

The apparatus 10 further include one or more equipment enclosures 20.

Figure 10:
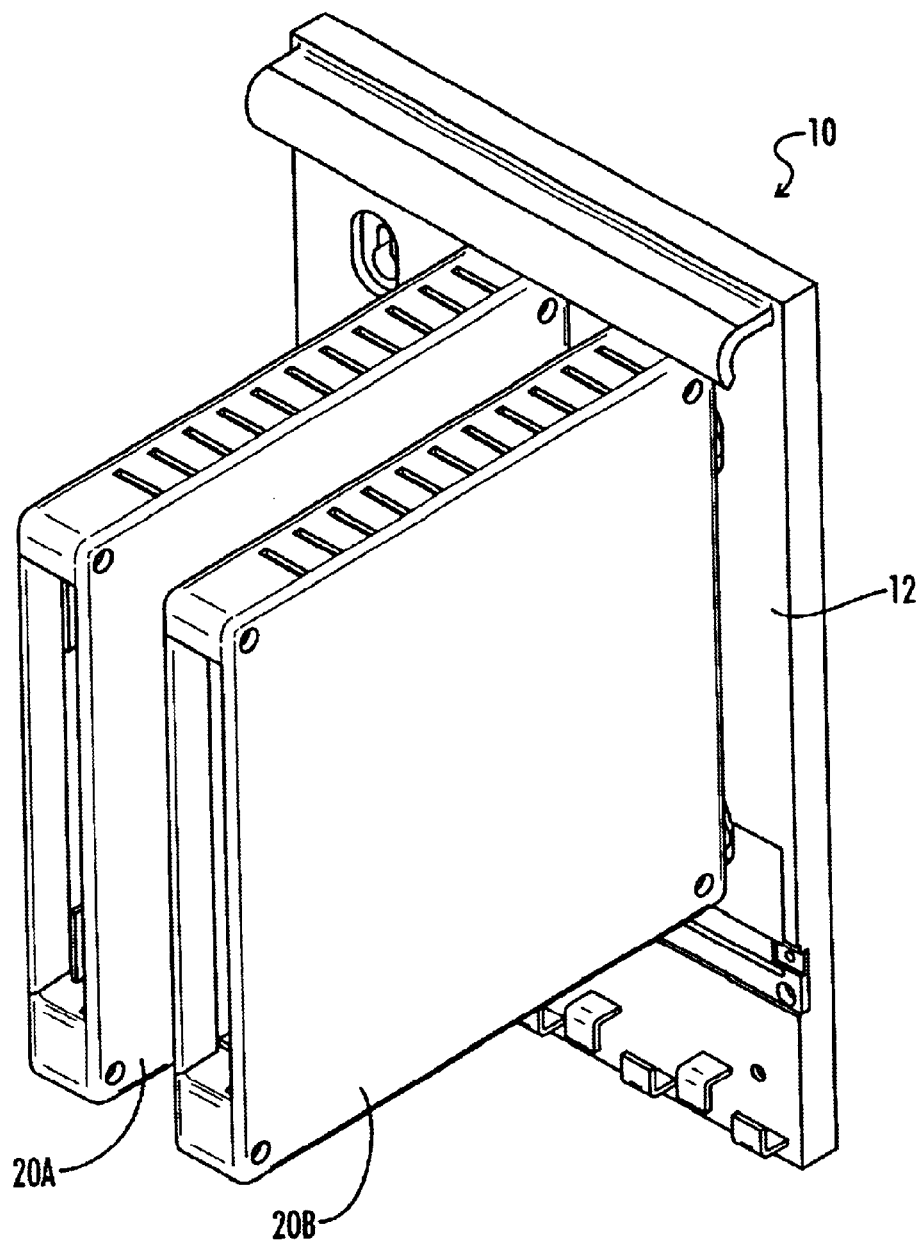
FIG. 10 is a view similar to FIG. 1 showing two enclosures mounted on the mounting plate.

FIG. 1 shows a single equipment enclosure 20 mounted on the wall plate 12. FIG. 10 shows two enclosures 20A and 20B mounted side by side on the wall plate 12.

Enclosure 20 is preferably formed as two molded plastic pieces, 21 and 23, which are joined together by screws received through openings 25.

Figure 4:
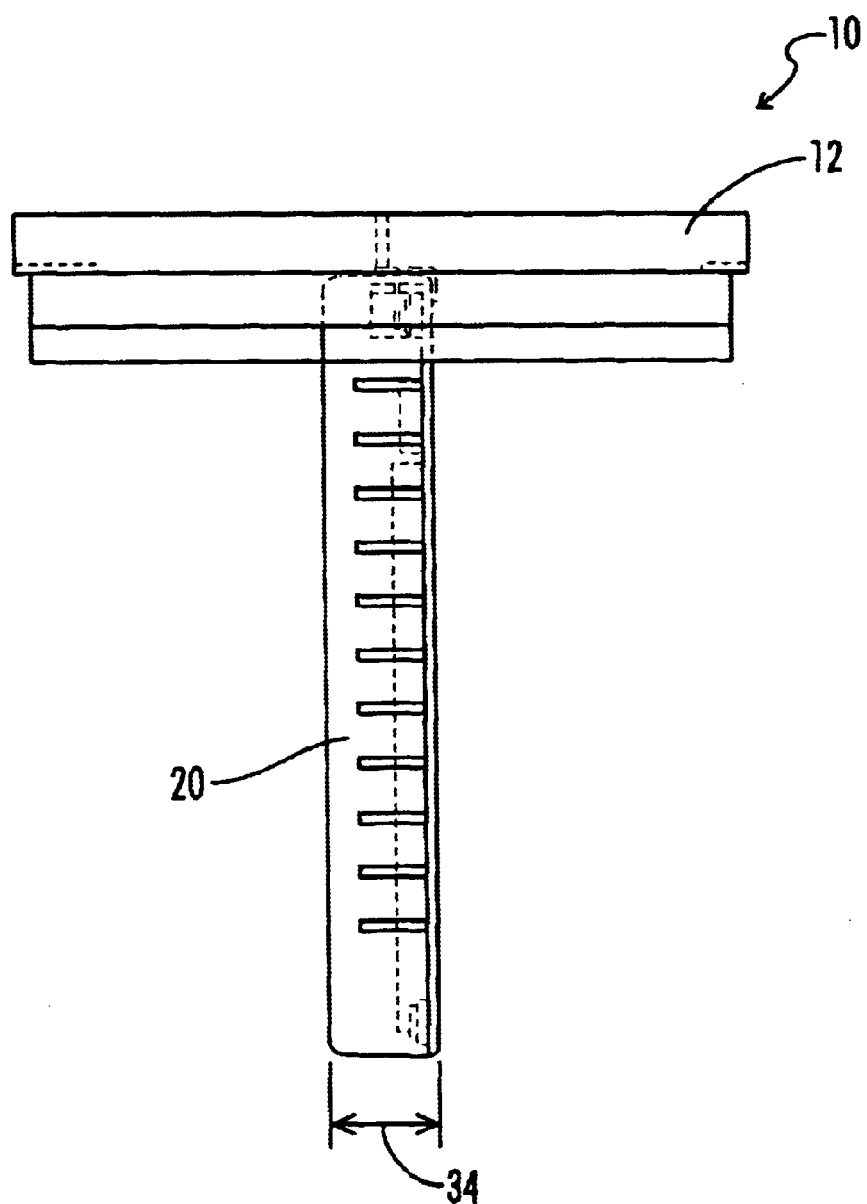
FIG. 4 is a top view of the apparatus of FIG. 1.
Figure 5:
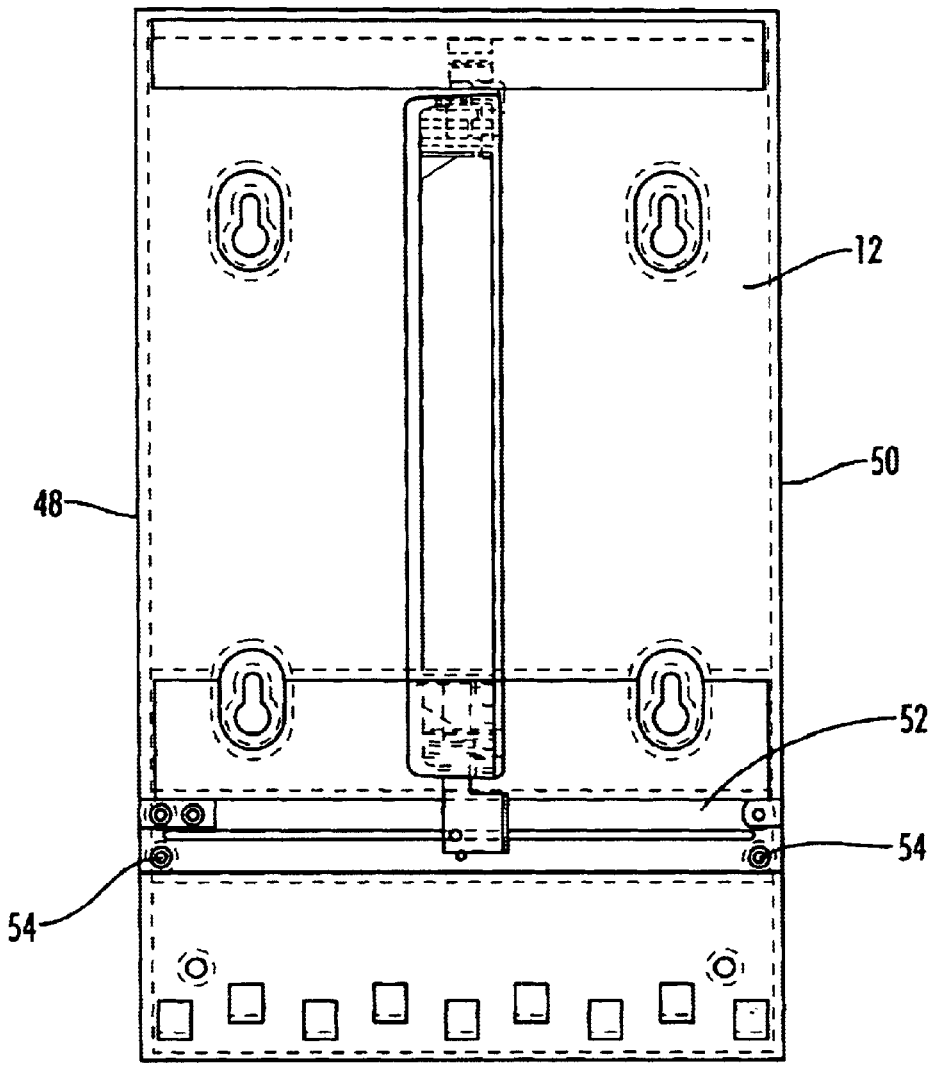
FIG. 5 is a front view of the mounting plate of FIG. 1.
Figure 6:
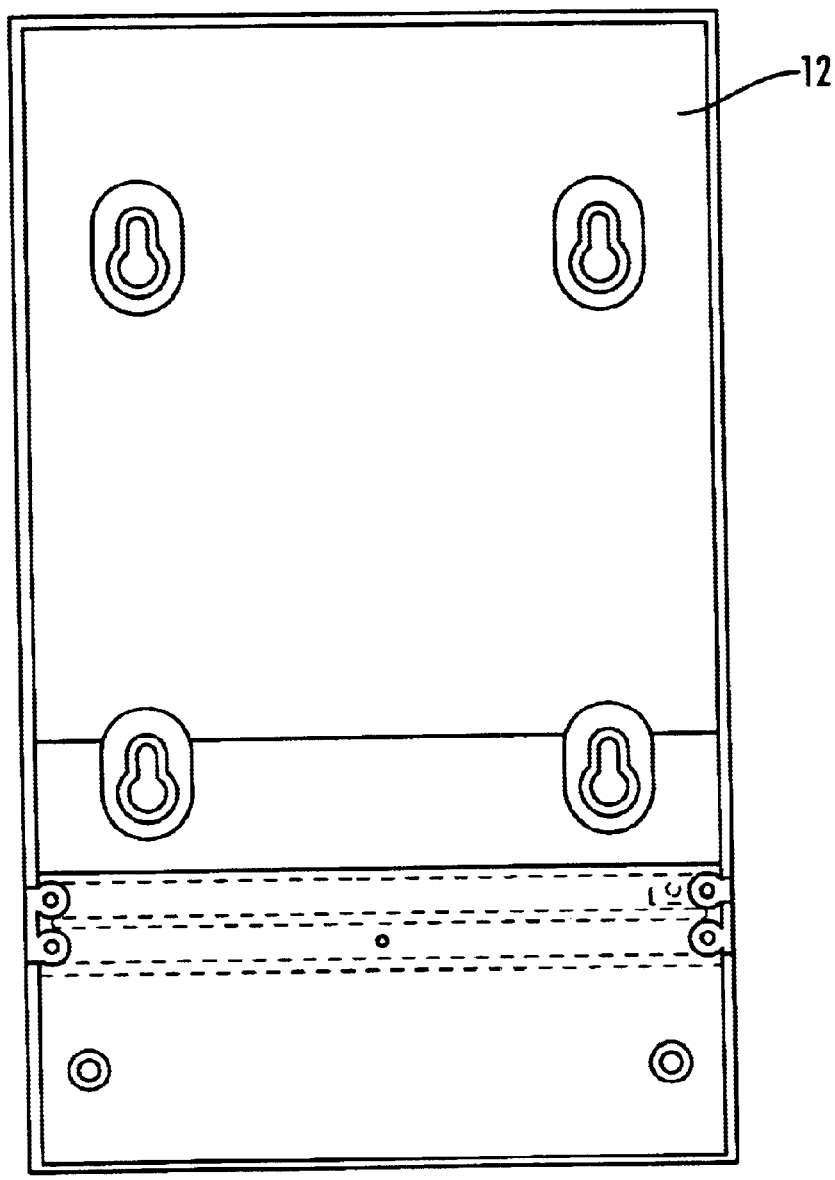
FIG. 6 is a rear view of the mounting plate of FIG. 5.

The equipment enclosure 20 is a shallow, flat, rectangular six sided box having two wider parallel spaced sides 22 and 24 joined by top, bottom, front and rear narrower sides 26, 28, 30 and 32. The narrower sides 26, 28, 30 and 32 have a width 34 (see FIG. 4) substantially less than either the height 36 or depth 38 of the wider sides 22 and 24 (see FIG. 9).

Figure 7:
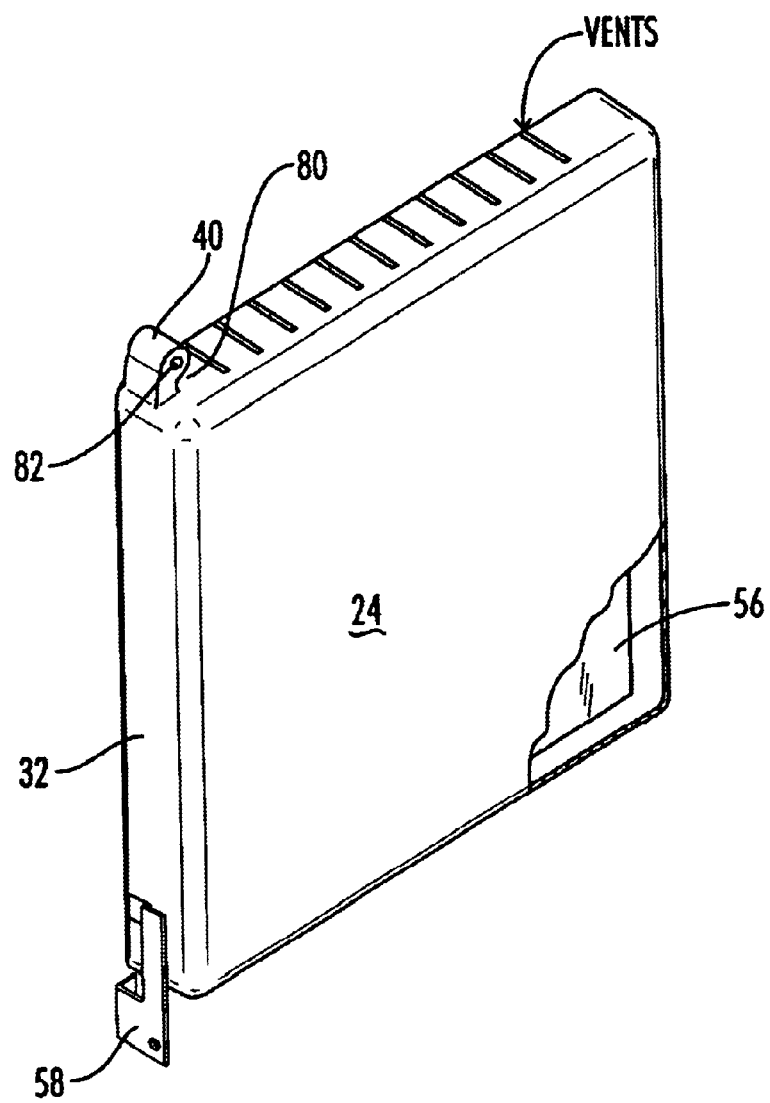
FIG. 7 is a perspective view of one of the equipment enclosures as viewed from the rear and from above on the left side.
Figure 8:
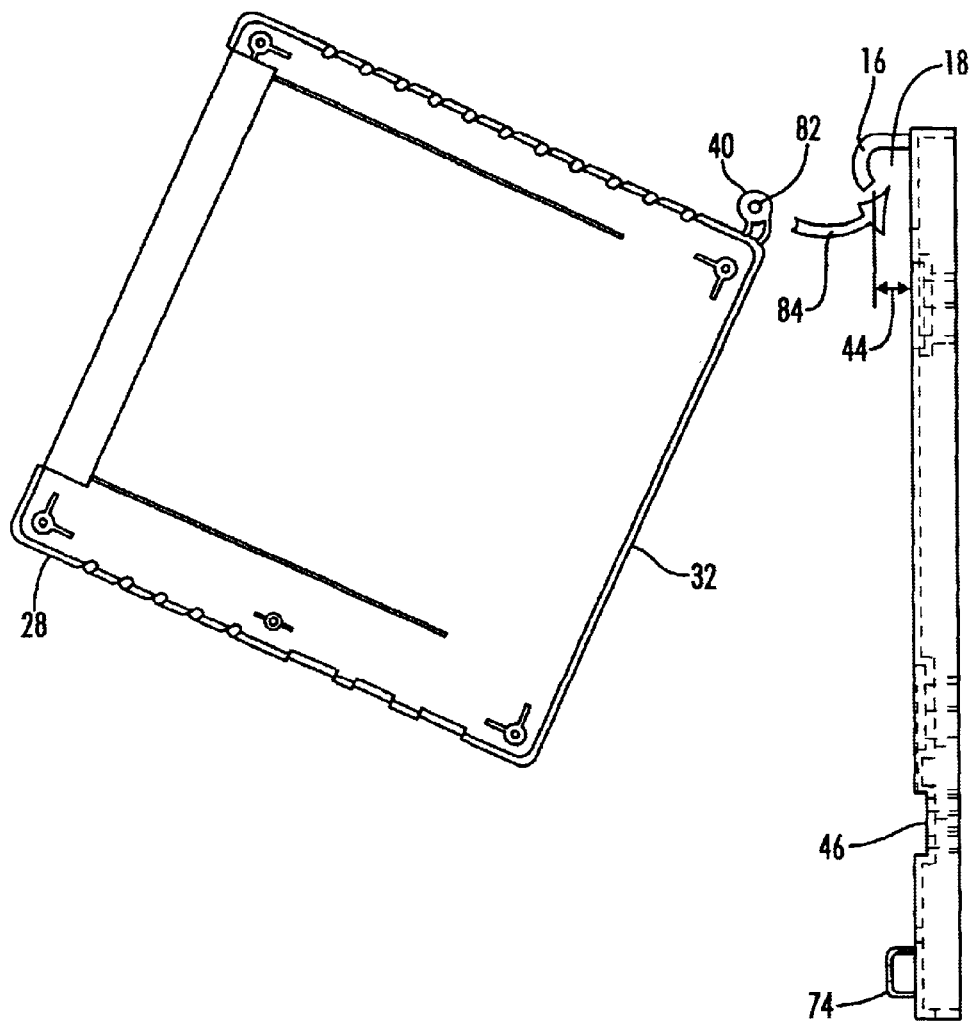
FIG. 8 is an exploded view of the apparatus of FIG. 1 viewed from the right hand side illustrating the enclosure which is about to be engaged with the mounting plate as indicated by the arrow.
Figure 9:
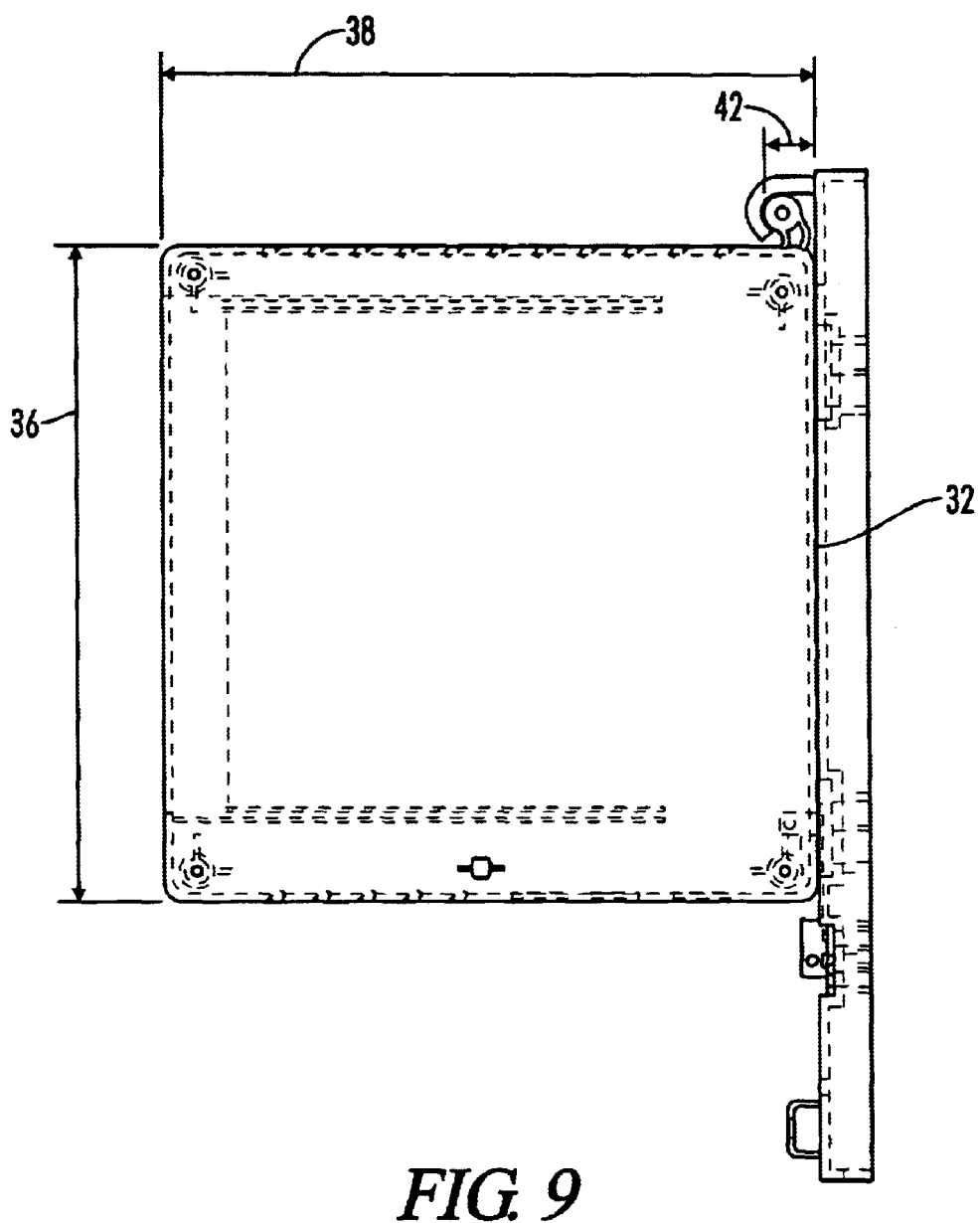
FIG. 9 is a right side elevation view of the apparatus of FIG. 1 showing the enclosure completely engaged with the mounting plate.

As best seen in FIGS. 7–9, the enclosure 20 includes an upwardly extending hooked hanger 40 which is complementary to the hooked lip 16 and received in the channel 18.

To mount the enclosure 20 on the wall plate 12, the enclosure 20 must first have its lower end tilted away from the enclosure 12, as illustrated in FIG. 8, so that the hooked end of the hanger 40 can be placed under the hooked lip 16 and into the channel 18. Then the lower end of the container 20 is pivoted toward the mounting plate 12 until the rear surface 32 of enclosure 20 engages the mounting plate 12, as shown in FIG. 9, at which point the hooked hanger 40 is received in interlocking engagement with the hooked lip 16, so that the enclosure 20 is suspended from or hung from the lip 16.

As seen in FIG. 9, the hanger 40 extends a forward distance 42 away from the rear side 32, which forward distance 42 is greater than an opening depth 44 (see FIG. 8) of the channel 18, so that the equipment enclosure 20 must have its lower end pivoted forward away from the wall plate 12 to remove the equipment enclosure 20 from the wall plate 12.

As seen in FIG. 7, the hanger 40 may be described as a protuberance 40 extending from the top side 26 adjacent the rear side 32. The protuberance 40 is hook shaped with the hook having an opening 80 facing away from rear side 32.

The protuberance 40 has an alternate mounting hole 82 defined therethrough parallel to the width 34 of the narrow sides of the enclosure, for mounting the enclosure 20 directly to a wall with the flat side 22 parallel to and engaging the wall. To mount the enclosure 20 in this alternative fashion, the right hand side 22 of the enclosure 20 is placed flat against the wall, and a screw (not shown) is placed through mounting hole 82 and screwed into the wall to snugly hold the flat surface 22 of enclosure 20 against the wall. A second screw is placed through an opening 59 in lug 58.

It is also possible to reverse the relationship of the channel and the protrusion. Generally, the interlocking engagement of the channel 18 and hanger 40 can be described as a channel on one of the mounting plate 12 and the component enclosure 20 and a complementary protrusion or protuberance on the other of the mounting plate 12 and the component enclosure 20. Further, it will be understood that the channel and hanger can take on a variety of shapes and configurations. For example, instead of utilizing the hooked lip 16 to define the channel 18, it would be possible to define the channel as an irregular shaped groove formed in a planar surface of the mounting plate 12.

The wall plate 12 has a recess 46 defined therein which extends from a left edge 48 of the wall plate to the right edge 50 of the wall plate. An electrically conducting grounding strip or grounding bar 52 is received in the recess 46 and is attached to the mounting plate 12 by screws (not shown) received through openings 54. The ground bar 52 is located at an elevation below the enclosure 20.

The enclosure 20 will have electrical equipment such as a printed circuit board 56 mounted therein. A grounding lug 58 is electrically connected to the equipment 56 and engages the grounding bar 52 when the enclosure 20 is pivoted to its mounted position as shown in FIG. 1.

It is noted that in FIG. 8, the grounding lug 58 and ground bar 52 are not shown, whereas those elements are included in FIG. 9.

The ground bar 52 has a horizontal slot 60 formed therein which its coincident with an opening 62 in lug 58 so that a self-tapping screw (not shown) may be used to securely attach the grounding lug 58 to the ground bar 52.

The top wall 26 of enclosure 20 has a plurality of vent openings 64 defined therein for venting heat away from the equipment contained in the enclosure 20.

The front wall 30 of enclosure 20 has a window 66 defined therein through which any visual indicators of the equipment 56 may be viewed. Such visual indicators may be LEDs with associated written indicia indicating the status of the operating components of the equipment 56.

The bottom wall 28 of enclosure 20 includes a plurality of communication openings 68, 70, and 72 through which various plug-in connectors may be extended to connect to the equipment contained in the enclosure 20. Bottom wall 28 also includes a plurality of vent openings 73.

A wire or cable holder system 74 is provided on a lower portion of the mounting plate 12 below the ground bar 52. Preferably, the cable holder system 74 includes a plurality of integrally molded fingers through which cables extending to the equipment 56 in enclosure 20 may be interweaved.

Figure 11:
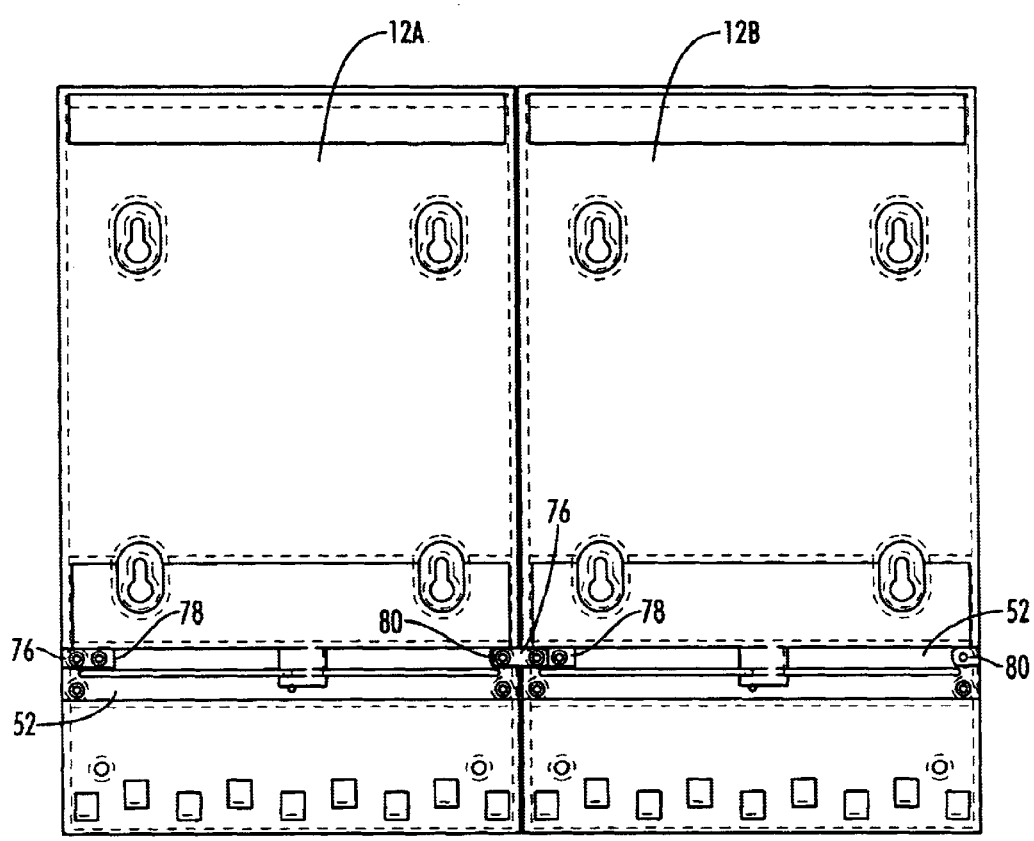
FIG. 11 is a front elevation view of two mounting plates mounted side-by-side on a wall with a bridge plate connecting the ground strips of the two mounting plates.

A plurality of enclosures 20A and 20B may be mounted upon the mounting plate 12 of the enclosure 20 extending parallel to each other and perpendicular from the mounting plate 12 as shown in FIG. 10. The spacing between adjacent enclosures 20A and 20B may be adjusted by adjusting the position of the enclosures 20A and 20B upon the mounting plate 12. If it is desired to mount more enclosures than can be supported from a single mounting plate 12, a second such mounting plate can be placed on the wall immediately adjacent the first mounting plate as shown in FIG. 11, thus providing an extended mounting apparatus in a modular fashion.

Also, enclosures 20 with different widths 34 may be mounted on the mounting plate 12.

When the second mounting plate 12B is mounted adjacent the first plate 12A, the open channel of the hooked lip of the second plate 12B will be aligned with that of the first mounting plate, as will the ground bar 52 of the second mounting plate 12B.

The ground bar 52 preferably provides an integral means for interconnecting the grounding bars of two adjacent mounting plates. This includes a connector strip 76 or bridge plate 76 which is slidably received within a planar recess 78 defined in the ground bar 52 adjacent left edge 48. The connector strip 76 may be extended from its retracted position (as illustrated for first mounting plate 12A in FIG. 11) to an extended position (as illustrated for second mounting plate 12B in FIG. 11) wherein the connector strip 76 overlaps into a shorter recess 80 in the adjacent ground bar 52. The connector strip 76 may be connected to each of the adjacent grounding bars 52 with screws (not shown) extending through the openings in the connector strip 76 and ground bars 52.

The Alternative Embodiment of FIGS. 12–14

Referring now to FIGS. 12–14, an alternative embodiment of the equipment mounting apparatus of the present invention is shown and generally designated by the numeral 100. The apparatus 100 includes a wall plate or mounting plate 102 and one or more equipment enclosures such as 104.

The apparatus 100 differs from the apparatus 10 primarily in that the height of the enclosures 104 has been lengthened so that the bottom side 106 thereof extends below the elevation of a ground strip 108.

As best seen in the rear view of FIG. 14, the equipment enclosure 104 includes a grounding lug 110 which will engage the ground strip 108 when the enclosure 104 is assembled with the wall plate 102 as shown in FIG. 12.

To hold the enclosure 104 firmly in place with the grounding lug 110 engaging the ground strip 100, an elongated grounding screw 112 extends through the width of the enclosure and through an opening 114 in the grounding lug 110 into threaded engagement with one of a plurality of threaded holes 116 formed in the ground strip 108.

Thus, to assemble the enclosure 104 with the wall plate 102, a hooked hanger 118 of enclosure 104 is engaged with a hooked lip 120 of wall plate 102 and the enclosure 104 is swung downwardly so that the grounding lug 110 engages grounding strip 108, and the ground screw 112 is then inserted and tightened into the threaded bore 116 to lock the enclosure 104 in place on the wall plate 102.

As can best be seen in FIG. 13, the wall plate 102 has a plurality of vertical dividers 122 separating the interior space of the hooked lip 120 into a plurality of adjacent compartments, each of which is sized to receive one of the hooked hangers 118. Thus, the dividers 122 determine the possible positions of the enclosure 104 along the length of the hooked lip 120. The threaded holes 116 correspond to the position of the ground screw 112 when the enclosure 104 is in the compartment of the hooked lip 120 located immediately above the particular threaded hole 116.

Methods of Mounting Equipment

The apparatus just described can be used to mount electrical equipment such as 56 on a wall in the following manner.

The mounting plate 12 is attached to the wall and has the horizontal channel 18 defined in an upper portion thereof.

The electrical equipment 56 is placed in an enclosure 20 which has an upwardly extending hanger 40 complementary to the channel 18 of the mounting plate 12.

The hanger 40 of the enclosure 20 is inserted, as indicated by arrow 84, into the channel 18 of the mounting plate 12 with the lower end 28 of the enclosure 20 tilted away from the mounting plate 12 as illustrated in FIG. 8.

Then the lower end 28 of the enclosure 20 is pivoted toward the mounting plate 12 until the backside 32 of the enclosure 20 abuts the mounting plate 12 as shown in FIG. 9, thereby holding the enclosure 20 in place upon the mounting plate 12 by the interlocking engagement of the hooked hanger 40 with the channel 18 defined in the hooked lip 16.

The position of the enclosure 20 along the width of the mounting plate 12 can be adjusted by sliding the hanger 14 along the length of the channel 18 to the desired position.

A second such enclosure 20B can be mounted beside the first enclosure 20A on the mounting plate 12 in the same manner as shown in FIG. 10, and the spacing therebetween can be adjusted by adjusting the position of one or both of the enclosures 20A or 20B upon the mounting plate 12.

The mounting plate 12 is provided with the ground bar 52, and when the enclosure 20 is pivoted into its interlocking engagement with the mounting plate 12, its ground lug 58 moves into engagement with the grounding bar 52 and can be secured thereto to secure the grounded connection.

A second such mounting plate 12B can be attached to the wall adjacent the first plate 12A, as shown in FIG. 11, with the horizontal channel 18 thereof aligned with that of the first mounting plate and with the grounding bar 52 thereof aligned with that of the first mounting plate, so as to provide an extended mounting apparatus in a modular manner. The ground bar 52 of the first and second mounting plates will be electrically connected by use of the bridge plate 76.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. Apparatus for mounting electrical equipment on a wall, comprising:

a wall plate adapted to be mounted on the wall, the wall plate including a hooked lip extending horizontally along an upper portion of the wall plate and defining a downwardly open channel; and an equipment enclosure, including an upwardly extending hooked hanger complementary to the hooked lip and received in the channel, and having a rear surface engaging the wall plate, the channel having an opening depth less than a forward extension distance of the hooked hanger away from the rear surface so that the equipment enclosure must have its lower end pivoted forward away from the wall plate to remove the equipment enclosure from the wall plate.

2. The apparatus of claim 1, further comprising:

a ground strip mounted on the wall plate; and a grounding lug extending from the equipment enclosure into engagement with the ground strip when the enclosure is hung from the hooked lip of the wall plate with the rear surface of the enclosure engaging the wall plate.

3. The apparatus of claim 2, wherein:

the ground strip is located at an elevation lower than the equipment enclosure.

4. The apparatus of claim 1, wherein:

the hooked lip is continuous so that a position of the equipment enclosure is infinitely adjustable along a length of the lip.

5. The apparatus of claim 1, wherein:

the equipment enclosure is a flat box having a vertical height, a horizontal width extending perpendicularly out from the wall plate, and a thickness parallel to a length of the lip, the thickness of the box being much less than the vertical height and the horizontal width of the box.

6. The apparatus of claim 5, wherein:

the box includes a bottom wall, a top wall and a front wall;

the bottom wall has a communication opening defined therein through which a conductor may extend to equipment in the enclosure;

the top wall includes a heat vent opening defined therein for venting heat from equipment in the enclosure; and the front wall includes an indicator display opening defined therein through which visual indicators of the equipment may be viewed.

7. The apparatus of claim 1, further comprising:

a wire holder attached to the wall plate below the equipment enclosure.

8. The apparatus of claim 1, wherein:

the wall plate is mounted on the wall; and further comprising a second wall plate mounted on the wall adjacent the first wall plate, the second wall plate having a second hooked lip aligned with the hooked lip of the first wall plate.

9. The apparatus of claim 8, further comprising:

first and second ground strips mounted on the first and second wall plates, respectively; and a connector strip connecting the first and second ground strips.

10. The apparatus of claim 1, further comprising:

a second equipment enclosure hung from the hooked lip of the wall plate and extending from the wall plate parallel to the first equipment enclosure.

11. Apparatus for mounting electrical equipment, comprising:

a rectangular wall plate module having a front, and left and right edges;

a linear channel defined in the wall plate module and extending across the front of the wall plate module, for receiving a complementary hanger of an equipment enclosure to be mounted on the wall plate module; and a ground strip attached to the wall plate module below the linear channel and extending parallel to the linear channel, for grounding equipment mounted on the wall plate module.

12. The apparatus of claim 11, wherein:

the wall plate module includes a forward extending lip which defines the linear channel.

13. The apparatus of claim 12, wherein:

the lip and the channel stop short of the left and right edges of the wall plate module.

14. The apparatus of claim 11, wherein:

the front of the wall plate module has a groove defined therein extending from the left edge to the right edge; and the ground strip is received in the groove.

15. The apparatus of claim 14, wherein:

the ground strip has a planar recess defined therein adjacent one of said left and right edges; and further comprising a bridge plate, slidably received in the planar recess and slidable from a retracted position to a bridging position wherein the bridge plate can overlap and be connected to a ground strip of an adjacent second wall plate module.

16. The apparatus of claim 11, further comprising:

a conductor holder attached to the wall plate module below the ground strip and defining a conductor passage extending parallel to the ground strip for receiving electrical conductors connected to equipment mounted on the wall plate module.

17. An equipment enclosure apparatus for mounting electrical equipment, comprising:

a shallow flat rectangular six sided box having two wider parallel spaced sides joined by four narrower sides, the narrower sides having a width substantially less than either dimension of the two wider sides, a first one of the narrower sides being a top side and a second one of the narrower sides being a back side;

a protuberance extending from the top side adjacent the back side, for hanging the box from a wall with the wider sides of the box extending perpendicular to the wall; wherein the protuberance is hook shaped with the hook having an opening facing away from the back side.

18. The apparatus of claim 17, wherein:

the top side has a plurality of vent openings defined therein.

19. The apparatus of claim 18, wherein:

another one of the narrower sides is a front side having an indicator viewing window defined therein.

20. The apparatus of claim 18, wherein:

another one of the narrower sides is a bottom side having a conductor access opening defined therein.

21. The apparatus of claim 17, further comprising:

an alternate mounting hole defined through the protuberance parallel to the width of the narrower sides for mounting the box directly to the wall with the wider sides of the box parallel to the wall.

22. A method of mounting electrical equipment on a wall, comprising:

(a) attaching a mounting plate to the wall, the mounting plate having a horizontal channel defined in an upper portion thereof;

(b) placing the electrical equipment in an equipment enclosure, the enclosure having an upwardly extending hanger complementary to the channel of the mounting plate;

(c) inserting the hanger of the enclosure into the channel of the mounting plate with a lower end of the enclosure tilted away from the mounting plate;

(d) then, pivoting the lower end of the enclosure toward the mounting plate so that the hanger moves outwardly relative to the mounting plate until a back side of the enclosure abuts the mounting plate;

(e) thereby holding the enclosure in place upon the mounting plate by an interlocking engagement of the hanger with the channel.

23. The method of claim 22, further comprising:

sliding the hanger along a length of the channel to adjust a position of the enclosure upon the mounting plate.

24. The method of claim 22, further comprising:

repeating steps (c)–(e) with a second enclosure to mount the second enclosure on the mounting plate.

25. The method of claim 22, wherein:

the mounting plate includes a ground strip and the enclosure includes a grounding lug; and further comprising in step (d), engaging the grounding lug of the enclosure with the grounding strip.

26. The method of claim 22, further comprising:

attaching a second mounting plate to the wall adjacent the first mounting plate, with a horizontal channel of the second mounting plate aligned with the horizontal channel of the first mounting plate.

27. The method of claim 26, wherein:

each of the first and second mounting plates includes a ground strip; and further comprising, electrically connecting the ground strips of the first and second mounting plates.

* * * * *